(12) United States Patent
Gonze et al.

(10) Patent No.: US 8,864,875 B2
(45) Date of Patent: Oct. 21, 2014

(54) REGENERATION OF A PARTICULATE FILTER BASED ON A PARTICULATE MATTER OXIDATION RATE

(71) Applicant: GM Global Technology Operations LLC, Detroit, MI (US)

(72) Inventors: Eugene V. Gonze, Pinckney, MI (US); Michael J. Paratore, Jr., Howell, MI (US); Julian C. Tan, Vernon Hills, IL (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/675,363

(22) Filed: Nov. 13, 2012

(65) Prior Publication Data

US 2014/0130665 A1    May 15, 2014

(51) Int. Cl.

| | |
|---|---|
| B01D 46/46 | (2006.01) |
| B01D 53/30 | (2006.01) |
| B01D 39/14 | (2006.01) |
| B01D 39/06 | (2006.01) |
| B01D 39/20 | (2006.01) |
| B01D 24/00 | (2006.01) |
| B01D 50/00 | (2006.01) |
| F01N 3/023 | (2006.01) |
| F01N 9/00 | (2006.01) |
| B01D 46/00 | (2006.01) |
| F01N 3/027 | (2006.01) |
| F01N 11/00 | (2006.01) |

(52) U.S. Cl.
CPC ............ *B01D 46/0063* (2013.01); *F01N 3/023* (2013.01); *F01N 9/00* (2013.01); *F01N 3/027* (2013.01); *F01N 11/00* (2013.01)
USPC ........ 95/8; 55/522; 55/523; 55/524; 422/169; 422/170; 422/171; 422/172; 422/177; 422/178; 422/179; 422/180; 422/181; 422/182

(58) Field of Classification Search
USPC ................... 95/8; 55/522–524; 422/169–172, 422/177–182
See application file for complete search history.

(56) References Cited

U.S. PATENT DOCUMENTS

| | | | | |
|---|---|---|---|---|
| 4,934,142 | A  * | 6/1990 | Hayashi et al. ................. | 60/297 |
| 6,823,663 | B2 * | 11/2004 | Hammerle et al. ............. | 60/286 |
| 7,188,469 | B2 * | 3/2007 | Bonadies et al. ................ | 60/286 |
| 8,057,581 | B2 * | 11/2011 | Gonze et al. ................. | 95/278 |
| 8,062,618 | B2 * | 11/2011 | Xu et al. .................... | 423/239.1 |
| 8,118,908 | B2 * | 2/2012 | Gonze et al. ..................... | 95/18 |
| 8,137,648 | B2 * | 3/2012 | Jen et al. ....................... | 423/210 |
| 8,501,104 | B2 * | 8/2013 | Honda et al. .................. | 422/171 |

(Continued)

*Primary Examiner* — Amber Orlando
(74) *Attorney, Agent, or Firm* — Cantor Colburn LLP

(57) ABSTRACT

An exhaust gas treatment system for an internal combustion engine is provided comprising an exhaust gas conduit, a particulate filter ("PF") device, a hydrocarbon source and an electronic control module including operative logic which when implemented. The PF has a filter structure for removal of particulates in the exhaust gas and is selectively regenerated based on an amount of particulates trapped within the filter structure of the PF device. The control module is in communication with the internal combustion engine and the hydrocarbon source, and receives a regeneration signal indicating the amount of particulates trapped within the filter structure of the PF device. The electronic control module includes control logic for monitoring the internal combustion engine prior to a regeneration event. The electronic control module includes control logic for determining a plurality operating parameters of the internal combustion engine based on the monitoring.

11 Claims, 2 Drawing Sheets

(56) References Cited

U.S. PATENT DOCUMENTS

| | | | |
|---|---|---|---|
| 2003/0140620 A1* | 7/2003 | Shigapov et al. | 60/286 |
| 2007/0128088 A1* | 6/2007 | Willey et al. | 422/171 |
| 2007/0220865 A1* | 9/2007 | Cunningham et al. | 60/286 |
| 2007/0283681 A1* | 12/2007 | Makkee et al. | 60/274 |
| 2009/0183551 A1* | 7/2009 | Fattic et al. | 73/23.31 |
| 2010/0095655 A1* | 4/2010 | Gonze et al. | 60/287 |
| 2010/0101409 A1* | 4/2010 | Bromberg et al. | 95/8 |
| 2010/0300070 A1* | 12/2010 | He et al. | 60/274 |
| 2013/0095013 A1* | 4/2013 | Banno et al. | 423/213.5 |
| 2013/0149222 A1* | 6/2013 | Blakeman et al. | 423/213.5 |

\* cited by examiner

REGENERATION OF A PARTICULATE FILTER BASED ON A PARTICULATE MATTER OXIDATION RATE

FIELD OF THE INVENTION

Exemplary embodiments of the invention relate to exhaust gas treatment systems for internal combustion engines and, more particularly, to an exhaust gas treatment system that modifies operation of an internal combustion engine during a regeneration event based on a particulate matter oxidation rate of a PF device.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("$NO_x$") as well as condensed phase particulate materials (liquids and solids) including carbon that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing CO and HC emissions is an oxidation catalyst device ("OC"). The OC device includes a flow-through substrate and a catalyst compound applied to the substrate. One type of exhaust treatment technology for reducing $NO_x$ emissions is a selective catalytic reduction ("SCR") device that may be positioned downstream of the OC device. An exhaust treatment technology in use for high levels of PM reduction may include a particulate filter ("PF") device that traps PM, which may be positioned downstream of the OC device and the SCR device. Regeneration is the process of removing the accumulated PM from the PF device.

A PM oxidation rate represents an amount of PM that is oxidized within the PF device per a unit of time during regeneration. Sometimes the PM is loaded or trapped within the PF device such that the PM is relatively more resistant to oxidation. For example, if the PM is densely packed in the PF device, or has a relatively high concentration of hydrocarbon, this may make the make the PM relatively more resistant to oxidation. As a result, higher input exhaust temperatures and longer heating times may be needed during regeneration, which in turn affects fuel consumption. Accordingly, it is desirable to provide a regeneration strategy that is more efficient when compared to some exhaust gas treatment systems currently available.

SUMMARY OF THE INVENTION

In one exemplary embodiment of the invention, an exhaust gas treatment system for an internal combustion engine is provided comprising an exhaust gas conduit, a particulate filter ("PF") device, a hydrocarbon source and an electronic control module including operative logic when implemented. The PF has a filter structure for removal of particulates in the exhaust gas and is selectively regenerated based on an amount of particulates trapped within the filter structure of the PF device. The control module is in communication with the internal combustion engine and selectively receives a regeneration signal indicating the amount of particulates trapped within the filter structure of the PF device. The electronic control module includes control logic for monitoring the internal combustion engine prior to a regeneration event. The electronic control module includes control logic for determining a plurality operating parameters of the internal combustion engine based on the monitoring. The control module includes control logic for determining a PM oxidation rate of the PF device based on the plurality of operating parameters. The control module includes control logic for activating the hydrocarbon source if the regeneration signal is received to increase an exhaust gas temperature to an exhaust gas setpoint. The exhaust gas setpoint is based on the PM oxidation rate of the PF device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
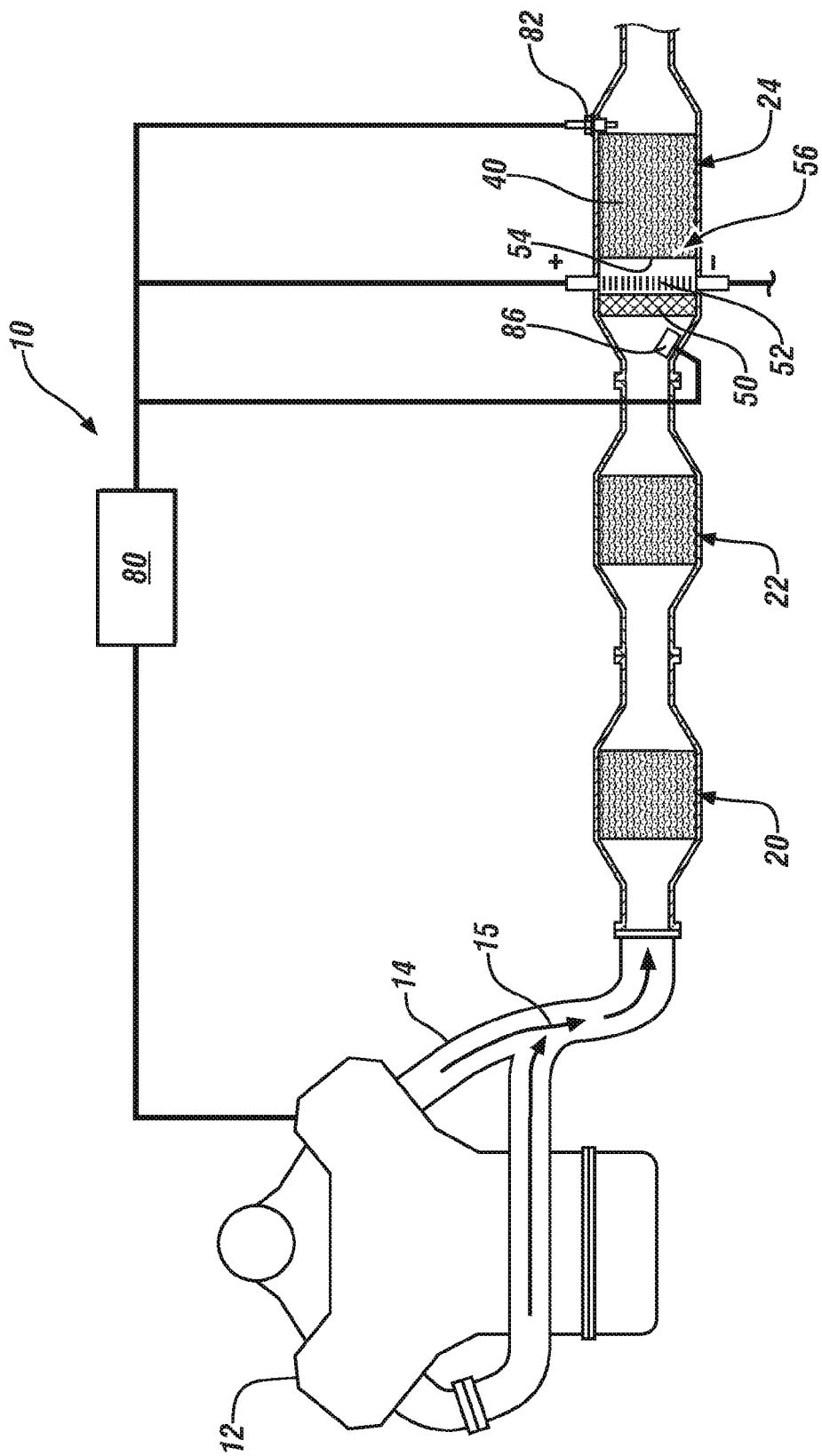
FIG. 1 is a schematic diagram of an exemplary exhaust gas treatment system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, or a combinational logic circuit.

Referring now to FIG. 1, an exemplary embodiment is directed to an exhaust gas treatment system 10, for the reduction of regulated exhaust gas constituents of an internal combustion ("IC") engine 12. The exhaust gas treatment system described herein can be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. FIG. 1 illustrates an oxidation catalyst device ("OC") 20, a selective catalytic reduction device ("SCR") 22 and a particulate filter ("PF") device 24. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC device 20 includes, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 20 is useful in treating unburned gaseous and non-volatile HC and CO, which are oxidized to form carbon dioxide and water.

The SCR device 22 may be disposed downstream of the OC device 20. In a manner similar to the OC device 20, the SCR device 22 may include, for example, a flow-through ceramic or metal monolith substrate that may be packaged in a stainless steel shell or canister having an inlet and an outlet in fluid communication with the exhaust gas conduit 14 and/or adjustment devices. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia ("$NH_3$").

The PF device 24 may be disposed downstream of the OC device 20 and the SCR device 22. The PF device 24 operates to filter the exhaust gas 15 of carbon and other particulates. In various embodiments, the PF device 24 may be constructed using a ceramic wall flow monolith filter 40 that is wrapped in an insulation mat or other suitable support that expands when heated, securing and insulating the filter 40. The filter 40 may be packaged in a shell or canister that is, for example, stainless steel, and that has an inlet and an outlet in fluid communication with exhaust gas conduit 14 and/or adjustment devices.

The ceramic wall flow monolith filter 40 may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 40 through the inlet ends of the inlet passages is forced to migrate through adjacent longitudinally extending walls to the outlet passages. It is through this wall flow mechanism that the exhaust gas 15 is filtered of PM. The filtered PM is deposited on the longitudinally extending walls of the inlet passages and, over time, will have the effect of increasing the exhaust gas 15 backpressure experienced by the IC engine 12. It is appreciated that the ceramic wall flow monolith filter 40 is merely exemplary in nature and that the PF device 24 may include other filter devices such as wound or packed fiber filters, open cell foams, sintered metal fibers, etc. The increase in exhaust backpressure caused by the accumulation of PM in the monolith filter 40 typically requires that the PF device 24 is periodically cleaned, or regenerated. Regeneration involves the oxidation or burning of the accumulated PM in what is typically a high temperature environment.

A laminar flow element 50 and an electric heater 52 are both located upstream of the PF device 24 and downstream of the SCR device 22. The laminar flow element 50 may include an open channel or honeycomb structure, and converts a turbulent flow of the exhaust gas 15 into a laminar flow of exhaust gas 15 prior to reception by the electric heater 52. The laminar flow element 50 and the heater element 52 may be attached to one another in one embodiment by fastening elements or other approaches.

The electric heater 52 is selectively energized to regenerate the PF device 24 and provide heat to the monolith filter 40. In the embodiment as shown, the electric heater 52 is positioned proximate to a front face 54 of the monolith filter 40 of the PF device 24. Specifically, the electric heater 52 is mounted adjacent to an upstream end 56 of the monolith filter 40. The electric heater 52 may include a resistive heating element 60 (shown in FIG. 2) such as, for example, a resistive wire. When energized, electric current flows to the electric heater 52 through the resistive element 60 to generate heat. The electric heater 52 allows for the exhaust gas 15 and PM to flow through to the PF device 24. In one exemplary embodiment, a zoned electric heater may be employed that heats individual sections to the monolith filter 40, however, it is to be understood that other types of electric heaters may be used as well.

Figure 2:
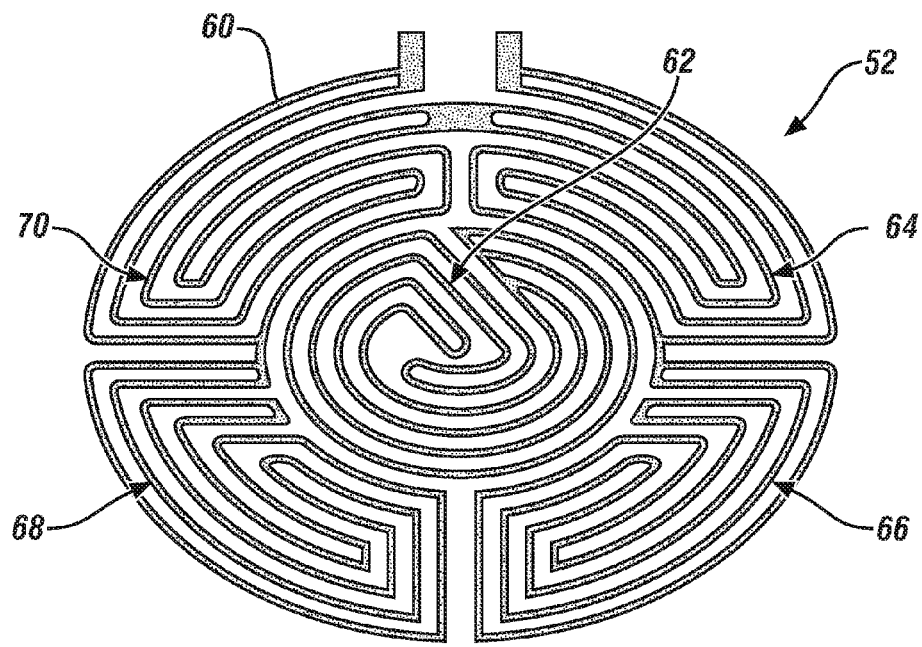
FIG. 2 is a schematic diagram of an electric heater illustrated in FIG. 1.

Turning now to FIG. 2, the electric heater 52 may be divided into a plurality of zones 62, 64, 66, 68, and 70. The electric heater 52 is configured to supply heat subsequently to each zone 62 through 70 such that the monolith filter 40 of the PF device 24 (shown in FIG. 1) is heated and regenerated in a zoned manner. Each zone 62 through 70 is individually heated such that the adjacent portion of the monolith filter 40 of the PF device 24 is selectively heated in stages. According to an embodiment of the present invention, each zone 62 through 70 can be heated separately by supplying power to the resistive heating element 60 located within each zone 62 through 70. For example, zone 62 may be heated first, thereby heating a center region of the monolith filter 40. Secondly, zone 64 may be heated to thereby heat an outer radial region of the monolith filter 40. The zones 66, 68, and 70 may be heated respectively to heat the remaining outer radial regions of the monolith filter 40. It is contemplated that the electric heater 52 may be segmented into a plurality of zones using a plurality of heater formats, therefore, the present invention is not limited to the embodiment of FIG. 2.

Turning back to FIG. 1, a control module 80 is operably connected to and monitors the engine 12, the electric heater 52, and a number of sensors in the exhaust gas conduit 14. Specifically, FIG. 1 illustrates the control module 80 in communication with a temperature sensor 82 located in the exhaust gas conduit 14 as well as a backpressure sensor 86. The temperature sensor 82 is situated downstream of the PF device 24, and sends electrical signals to the control module 80 indicating the temperature in the exhaust gas conduit 14 in a specific location. That is, the temperature sensor 82 indicates the temperature of the PF device 24. The backpressure sensor 86 is located upstream of the PF device 24 and generates a signal indicative of the carbon loading and PM loading in the monolith filter 40. It should be noted that while FIG. 1 illustrates a backpressure sensor 86 for determining carbon loading in the monolith filter 40, other approaches may be used as well for determining carbon loading. For example, in an alternative embodiment, a delta pressure sensor may be used instead to measure the differential pressure across the PF device 24. The control module 80 includes control logic for continuously monitoring the backpressure sensor 86 and the temperature sensor 82. The control module 80 includes control logic for continuously monitoring the temperature sensor 82 for a temperature reading of the PF device 24. The control module 80 also includes control logic for monitoring the backpressure sensor 86 for the amount of PM trapped within the monolith filter 40 of the PF device 24.

The control module 80 includes control logic for monitoring various operating parameters of the engine 12 and the exhaust gas treatment system 10 to determine a PM oxidation rate. The PM oxidation rate represents an amount of PM that is oxidized within the PF device 24 per a unit of time during regeneration. Specifically, the PM oxidation rate is determined prior to a specific regeneration event of the PF device 24, and is based on a plurality of operating parameters. The operating parameters include a PM generation rate, an exhaust flow, and a hydrocarbon slip of the PF device 24. The operating parameters may further include a PM temperature, an engine gas recirculation ("EGR") rate, and a coefficient lambda Λ. The operating parameters are further discussed below.

The PM generation rate represents the amount of PM that is generated by the engine 12. The PM generation rate may be determined by the amount of fuel delivered and the operating conditions of the engine 12. In one embodiment, the control module 80 integrates the PM generation rate to determine the PM trapped in the PF device 24 at a given time. The control module 80 includes control logic for calculating an exhaust flow rate located within the exhaust gas conduit 14. The exhaust flow rate is based on the intake air mass of the engine 12, which is measured by an intake air mass airflow sensor (not shown) as well as a fuel mass flow of the engine 12. Specifically, the exhaust flow of the engine 12 is calculated by adding the intake air mass of the engine 12 and the fuel mass flow of the engine 12. The hydrocarbon slip of the PF device 24 is representative of HC that passes the OC device 20 without being catalyzed, as the OC device 20 may not entirely catalyze all of the HC introduced into the exhaust gas stream 15. Specifically, the exhaust treatment system 10 may include one or more hydrocarbon injectors (not shown) that inject hydrocarbons (e.g., fuel) upstream from the OC device 20. Alternatively, the engine 12 combustion may be controlled using the control module 80 to perform post-combustion fuel injection to introduce HC into the exhaust gas.

The PM temperature represents the temperature of the PM trapped within the PF device 24, and may be measured by the temperature sensor 82. The EGR rate represents the amount or flow rate of recirculated exhaust gas that is part of the intake air of the engine 12. The coefficient lambda Λ is determined by monitoring the engine 12 and $NO_x$ sensors (not shown) located in the exhaust gas conduit 14. The coefficient lambda Λ indicates the stoichiometric point of the engine 12, where a value less than 1.0 indicates the engine 12 is running rich, and a value more than 1.0 is running lean.

The control module 80 includes control logic for selectively initiating regeneration of the PF device 24. Regeneration occurs if the amount of particulates trapped within the monolith filter 40 causes the pressure within the filter 40 to exceed a threshold pressure value determined by the backpressure sensor 86, and generate a signal indicative of the need to regenerate, or if the temperature reading from the temperature sensor 82 exceeds a threshold temperature value indicative of the ability to regenerate. Specifically, the control module 80 may initiate regeneration by continuously adjusting the operating parameters of a hydrocarbon source. In one embodiment, the hydrocarbon source is the engine 12, and operating parameters such as, for example, fuel injection timing and quantity, may be controlled to adjust the exhaust gas 15 temperature. Alternatively, in another approach the hydrocarbon source is a hydrocarbon injector, and the control module 80 includes control logic for controlling the amount of HC injected into the exhaust gas stream 15 by one or more HC injectors (not shown) for controlling the exhaust gas 15 temperature.

The control module 80 includes control logic for determining an exhaust gas setpoint. The control module 80 includes control logic for selectively elevating the temperature of the exhaust gas 15 to the exhaust gas setpoint value. The exhaust gas setpoint value represents an elevated temperature of the exhaust gas 15 that is needed during regeneration to generally prevent a condition where oxidizing PM is extinguished before regeneration is complete. The oxidizing PM located in the PF filter 24 may be extinguished before regeneration is complete by a relatively high exhaust flow rate in the exhaust gas conduit 14. The exhaust gas setpoint is a function of the PM oxidation rate. For example, if the PM oxidation rate indicates that the PF filter 24 is loaded or trapped with PM that is relatively more resistant to oxidation (e.g., if the PM is densely packed in the PF device 24), then the exhaust gas setpoint value is a relatively high value (e.g., about 700° C.). Likewise, if the PM oxidation rate indicates that the PF filter 40 is loaded with PM that is relatively less resistant to oxidation, then the exhaust gas setpoint value is set to a relatively low value (e.g., about 550° C.). The temperature of the exhaust gas 15 may be elevated to the exhaust gas setpoint by modifying operation of the engine 12.

The control module 80 may also include control logic for activating the electrical heater 52 once the exhaust gas 15 has reached the exhaust gas setpoint during regeneration. The electrical heater 52 is energized and acts as an additional heat source during regeneration, thereby decreasing the amount of time needed to complete regeneration. In one embodiment, if a zoned electric heater is employed, the control module 80 may activate zones 62 through 70 (shown in FIG. 2) of the electric heater 52 to selectively heat corresponding zones of the monolith filter 40 of the PF device, however, it is to be understood that other types of electric heaters may be used as well.

The exhaust gas treatment system 10 as described above determines the temperature of the exhaust gas 15 during regeneration based on the PM oxidation rate of the PM trapped within the PF device 24. For example, if the PM oxidation rate indicates that the PF filter 40 is loaded with PM that is relatively less resistant to oxidation, then the exhaust gas setpoint value is set to a relatively low value. The relatively low exhaust gas temperature will in turn reduce the input exhaust temperatures and heating time needed during regeneration of the PF device 24, thereby reducing the fuel consumption of the engine 12.

Figure 3:
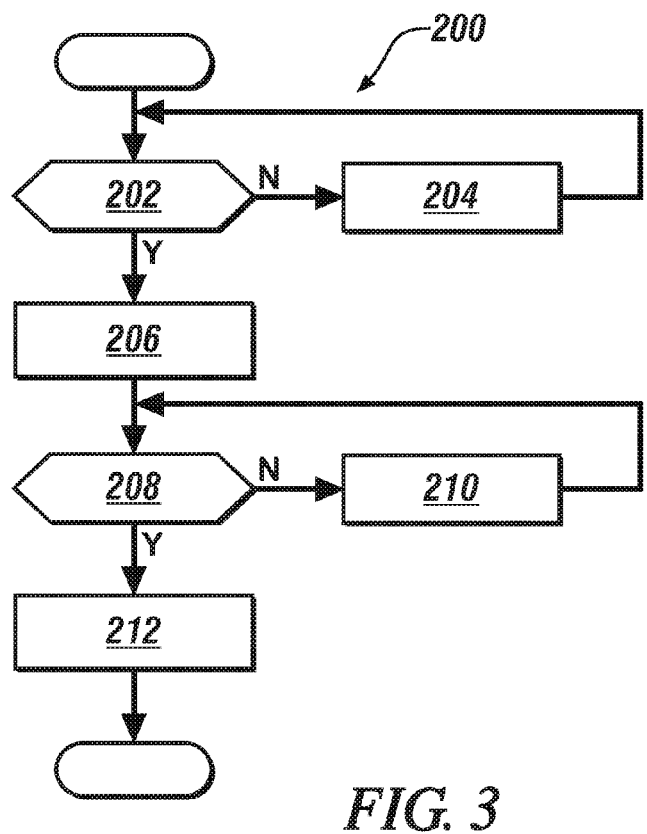
FIG. 3 is a process flow diagram illustrating a method of operating the exhaust gas treatment system shown in FIG. 1.

A method of regenerating the PF device 24 will now be explained. Referring to FIG. 3, an exemplary process flow diagram illustrating an exemplary process of operating the exhaust gas treatment system 10 is generally indicated by reference number 200. Referring generally to FIGS. 1-3, process 200 begins at step 202, where the control module 80 includes control logic for determining if a regeneration signal is received. The regeneration signal may be produced by a combination of the temperature sensor 82 and backpressure sensor 86 (e.g., if the backpressure sensor 86 generates a signal indicative of the need to regenerate and the temperature sensor 82 generates a signal indicative of the ability to regenerate.) If the control module 80 does not receive the regeneration signal, method 200 may proceed to step 204.

In step 204, the control module 80 monitors various operating parameters of the engine 12 and the exhaust gas treatment system 10 to determine the PM oxidation rate. Specifically, the control module 80 may monitor various operating parameters including the PM generation rate of the engine 12, the exhaust flow, the hydrocarbon slip of the PF device 24, the PM temperature of the PF device, the EGR rate, and the coefficient lambda Λ. Method 200 may then return to step 202, or terminate.

If the control module 80 receives the regeneration signal, method 200 may proceed to step 206. In step 206, the control module 80 initiates regeneration of the PF device 24, where the exhaust gas 14 temperature is elevated to the exhaust gas setpoint. Specifically, the control module 80 may initiate regeneration and elevate the exhaust gas temperature 15 by activating a hydrocarbon source. Specifically, the hydrocarbon source may be the engine 12, the operating parameters of the engine 12 are continuously adjusted to elevate the exhaust gas temperature. Alternatively, in another approach the control module 80 includes control logic for controlling the amount of hydrocarbons injected into the exhaust gas stream 15 by one or more hydrocarbon injectors (not shown) for controlling the exhaust gas 15 temperature. Method 200 may then proceed to step 208.

In step 208, the control module 80 may monitor the exhaust gas temperature through sensors located in the exhaust gas conduit 14 (e.g., the temperature sensor 82 shown in FIG. 1) to determine if the exhaust gas temperature has reached the exhaust gas setpoint value. If the exhaust gas setpoint value has not been reached, method 200 proceeds to step 210, where the exhaust gas temperature is raised by modifying operating parameters of the engine 12. Method 200 may then return to step 208.

If the exhaust gas setpoint value has been reached, method 200 proceeds to step 212, where the electric heater 52 is activated to regenerate the PF device 24 by providing heat to the monolith filter 40. The electrical heater 52 acts as an additional heat source during regeneration, thereby decreasing the amount of time needed to complete regeneration. Specifically, for example, if the electric heater 52 is a zoned electric heater, the control module 80 may activate the various zones (e.g., zones 62 through 70 shown in FIG. 2) of the electric heater 52 to heat the monolith filter 40 of the PF device. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
    an exhaust gas conduit in fluid communication with, and configured to receive an exhaust gas from, the internal combustion engine;
    a hydrocarbon source;
    a particulate filter ("PF") device in fluid communication with the exhaust gas conduit and having a filter structure for removal of particulates in the exhaust gas, the PF device configured to be selectively regenerated based on an amount of particulates trapped within the filter structure of the PF device;
    an electric heater disposed upstream of the filter structure and in fluid communication with the exhaust gas conduit, the electric heater selectively energized to produce heat during a regeneration event; and
    an electronic control module including operative logic which when implemented and in communication with the internal combustion engine and the hydrocarbon source, the electronic control module selectively receiving a regeneration signal indicating the amount of particulates trapped within the filter structure of the PF device, the control module programmed to:
        (a) monitor the internal combustion engine and the exhaust gas treatment system prior to a regeneration event;
        (b) determine a plurality operating parameters based on the monitoring;
        (c) determine a particulate matter oxidation rate of the PF device based on the plurality of operating parameters, wherein the plurality of operating parameters include a particulate matter rate, an exhaust flow, and a hydrocarbon slip;
        (d) modify operation of the hydrocarbon source if the regeneration signal is received to increase an exhaust gas temperature to an exhaust gas setpoint, the exhaust gas regeneration setpoint based on the particulate matter oxidation rate of the PF device; and
        (e) energize the electric heater to produce heat during the regeneration event if the exhaust gas temperature is at the exhaust gas setpoint.

2. The exhaust gas treatment system of claim 1, wherein the electric heater is a zoned electric heater.

3. The exhaust gas treatment system of claim 1, further comprising a laminar flow element located upstream of the PF device, the laminar flow element converting a turbulent flow of the exhaust gas into a laminar flow of exhaust gas prior to reception by the electric heater.

4. The exhaust gas treatment system of claim 3, wherein the laminar flow element and the heater element are attached to one another.

5. The exhaust gas treatment system of claim 1, wherein the operating parameters further include a particulate matter temperature, an engine gas recirculation ("EGR") rate and a coefficient lambda $\Lambda$.

6. The exhaust gas treatment system of claim 1, further comprising a temperature sensor and a backpressure sensor in communication with the control module, wherein the regeneration signal is produced by a combination the temperature sensor and backpressure sensor.

7. A method of controlling regeneration in an exhaust gas treatment system for an internal combustion engine, comprising:
    monitoring the internal combustion engine and the exhaust gas treatment system prior to a regeneration event by an electronic control module including operative logic when implemented;
    determining a plurality operating parameters based on the monitoring;
    determining a particulate matter oxidation rate of a PF device based on the plurality of operating parameters, wherein the plurality of operating parameters include a particulate matter rate, an exhaust flow, and a hydrocarbon slip;
    modifying operation of a hydrocarbon source if a regeneration signal is received to increase an exhaust gas temperature to an exhaust gas setpoint, the exhaust gas regeneration setpoint based on the particulate matter oxidation rate of the PF device; and
    energizing an electric heater to produce heat during the regeneration event if the exhaust gas temperature is at the exhaust gas setpoint.

8. The method of claim 7, wherein the electric heater is a zoned electric heater.

9. The method of claim 7, comprising providing a laminar flow element located upstream of the PF device, the laminar flow element converting a turbulent flow of the exhaust gas into a laminar flow of exhaust gas prior to reception by the electric heater.

10. The method of claim 7, comprising further including a particulate matter temperature, an engine gas recirculation ("EGR") rate, and a coefficient lambda $\Lambda$ as the plurality of operating parameters.

11. The method of claim 7, further comprising a temperature sensor and a backpressure sensor in communication with the control module, wherein the regeneration signal is produced by a combination the temperature sensor and backpressure sensor.

\* \* \* \* \*